Oct. 10, 1939. D. W. SHURTZ 2,175,974
WELDER'S VISE
Filed Jan. 18, 1938
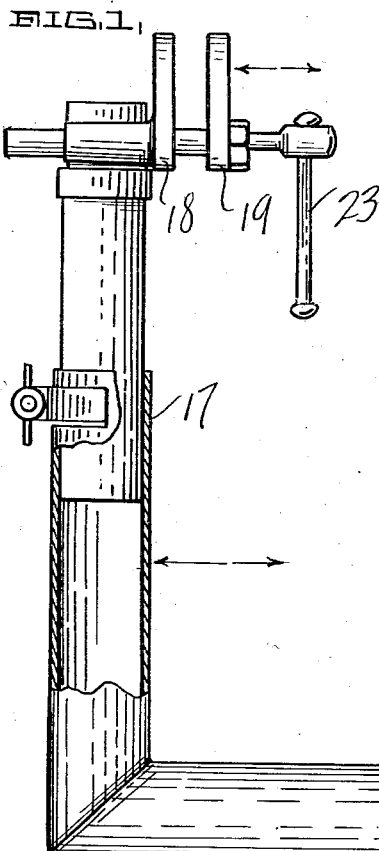
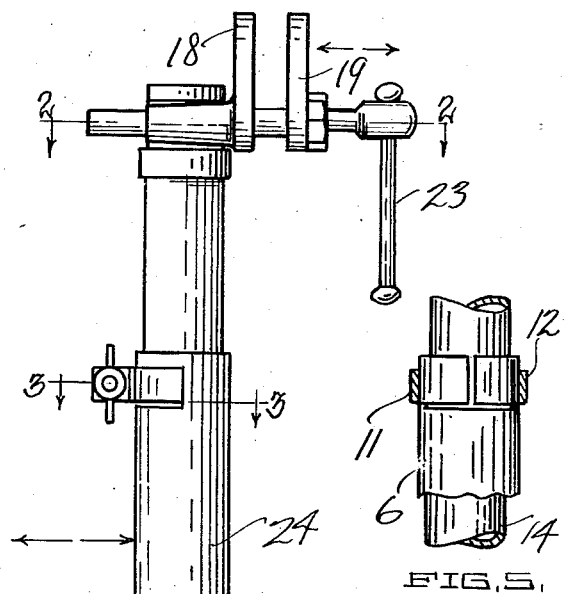
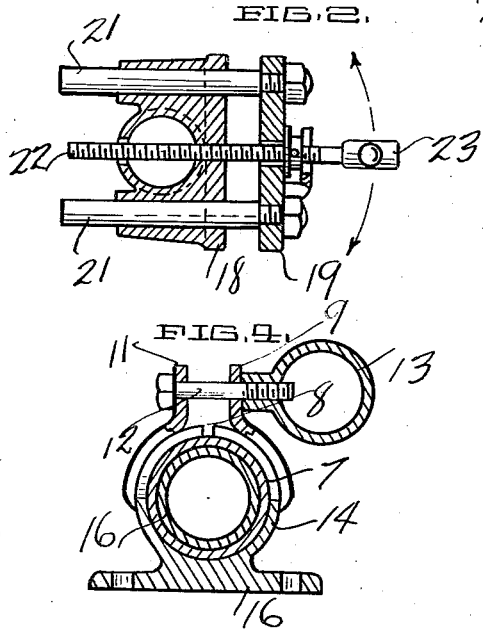
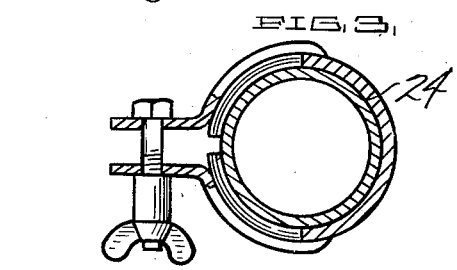
INVENTOR.
D. W. SHURTZ.
BY Victor J Evans & Co.
ATTORNEYS.

Patented Oct. 10, 1939

2,175,974

UNITED STATES PATENT OFFICE 2,175,974

WELDER'S VISE

Douglas W. Shurtz, Modesto, Calif.

Application January 18, 1938, Serial No. 185,604

1 Claim. (Cl. 113—99)

This invention relates to improvements in vises and has particular reference to a universally adjustable vise for holding material to be welded during a welding operation.

A further object is to produce a device of this character which may be readily attached to a suitable support, such as a work bench, and one which may be readily transported from place to place.

A further object is to provide for adjustments so that two parts to be welded together may be accurately held in alignment.

Other objects and advantages will be apparent during the course of the following description.

In the accompanying drawing forming a part of this specification and in which like numerals are employed to designate like parts throughout the same, Fig. 1 is a side elevation of my device;

Fig. 2 is a cross sectional view taken on the line 2—2 of Fig. 1;

Fig. 3 is a cross sectional view taken on the line 3—3 of Fig. 1;

Fig. 4 is a cross sectional view taken on the line 4—4 of Fig. 1; and

Fig. 5 is a fragmentary view showing the split clamping tube.

In welding it is necessary to hold the two parts to be welded in proper alignment. As these parts are often oddly shaped, various adjustments must be made in order to hold them together. Therefore, I have produced a vise capable of almost any possible adjustment.

In the accompanying drawing wherein for the purpose of illustration is shown a preferred embodiment of my invention, the numeral 5 designates a support, such as a work bench, upon which is mounted a tubular member 6 which is bolted or otherwise secured to the work support. This tubular member is split, as shown at 7 and 8. Ears 9 and 11 are attached to the split wings so that a bolt 12 and a hand nut 13 may be employed to move the ears and their connected wings so as to effect a clamping of a sliding member 14. This sliding member is also split and is provided with a clamping arrangement, similar to that just described, to adjustably hold an L-shaped member 16. The free end of this L-shaped member is also split and is provided with clamping means so as to adjustably retain a vise tube 17, upon which is mounted a vise jaw 18 and a sliding vise jaw 19. The sliding vise jaw 19 is provided with guides 21 and an adjusting screw 22, which is rotated through the medium of a hand lever 23 to move the sliding jaw 19 to or away from the jaw 18. Carried upon the sliding member 14 is an upright 24 corresponding to the free end of the L-shaped member 16. A vise support is also slidably carried thereby and has at its upper end a vise similar to that described for 18 and 19 and to which the same numerals have been applied.

It will be apparent that by adjusting the various parts vertically, horizontally, or by rotating the same, almost any possible clamping adjustment may be accomplished.

It is to be understood that the form of my invention herewith shown and described is to be taken as a preferred example of the same and that various changes relative to the material, size, shape and arrangement of parts may be resorted to without departing from the spirit of the invention or the scope of the subjoined claim.

Having thus described my invention, I claim:

In a device of the character described, a fixed tubular clamp member, an L-shaped tubular vise supporting member having one end thereof extending into said clamp member, a slidable and swingable vise support mounted on the horizontal section of said L-shaped member, the upright section of said L-shaped member being provided with an adjustable telescopic tube having a fixed vise jaw mounted thereon, a movable jaw cooperating therewith, guides extending from said movable jaw through said fixed jaw, an adjusting screw extending through said jaws, and a similar vise arrangement mounted on said swingable and slidable support and cooperating with said first-mentioned vise.

DOUGLAS W. SHURTZ.